April 9, 1946.  R. ZIMMERMANN  2,398,171

BEVEL GEAR GAUGE FOR BACK TO CROWN DIMENSIONS

Filed Jan. 24, 1944

INVENTOR.
Robert Zimmermann
BY
ATTORNEY

Patented Apr. 9, 1946

2,398,171

UNITED STATES PATENT OFFICE 2,398,171

BEVEL GEAR GAUGE FOR BACK TO CROWN DIMENSIONS

Robert Zimmermann, New York, N. Y., assignor to Hall Young Kaighin, New York, N. Y.

Application January 24, 1944, Serial No. 519,470

6 Claims. (Cl. 33—172)

This invention relates to new and useful improvements in a bevel gear gauge for back to crown dimensions.

More specifically the invention proposes the construction of a bevel gear gauge for back to crown dimensions which permits an accurate measurement to be taken merely by placing a blank of a bevel gear or a completed bevel gear upon the device with the application of pressure thereto, to move it downwards until the crown edge of the gear engages a groove in a rod arranged in connection with the device for measuring the movement of the device which is equal to the distance of the dimension from the back to the crown.

Still further the invention proposes the provision of a gauge arranged in connection with a slidable member upon which the gauge is rested and which has an actuating arm engaging the rod to register measurement on the gauge as the gear moves downward relative to the rod.

Still further it is proposed to provide the device with a slidably mounted flat support upon which the gauge is mounted and upon which the gear to be measured is adapted to be placed and which is resiliently urged upwards in a manner to return the flat support member to the initial starting position upon completion of each measurement.

A further object of the invention proposes the provision of an adjustment whereby the position of the flat support member may be adjusted relative to the rod and groove formed therein to cause the gauge to register a certain measurement less than the dimension of the back to crown measurement of a particular gear requiring a less movement of the flat support member to actually measure the back to crown dimension of the particular gear.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
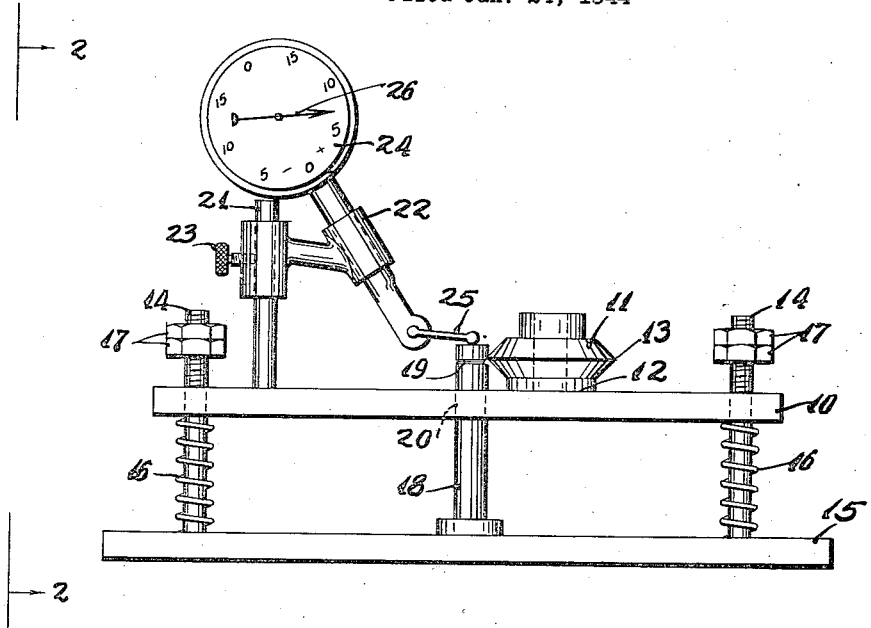
Fig. 1 is a front elevational view of a bevel gear gauge for back to crown dimensions constructed in accordance with this invention.
Figure 2:
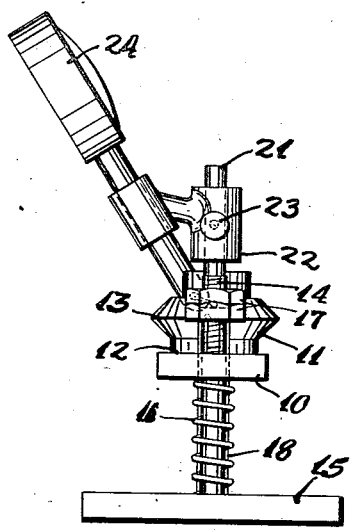
Fig. 2 is a side elevational view of Fig. 1 looking in the direction of the line 2—2.

The bevel gear gauge for back to crown dimensions, according to this invention, includes a flat support 10 upon which a bevel gear 11 may be rested upon its back 12 to permit a measurement from the back 12 to the crown 13. The flat support 10 is vertically slidably supported on several spaced vertical studs 14 which project from a base member 15. Expansion springs 16 are coaxially mounted upon the vertical studs 14 and are provided with a purpose of urging the flat support 10 into a raised position against a pair of lock nuts 17 threadedly engaged upon the top end of each of the vertical studs 14. A rod 18 is disposed at right angles to the flat support 10 and is provided with a circular groove 19 into which the crown edge of the bevel gear 13 is adapted to engage. The bottom end of the rod 18 rests upon the base 15 and the top end thereof is slidably projected through a hole 20 formed in the flat support 10 to permit the flat support 10 to move downwards upon its supporting studs 14 relative to the rod 18. The bevel gear to be measured when rested upon the flat support 10 is adapted to have its crown edge 13 engage the side of the rod 18 to permit the gear 11 and the flat support 10 to be urged downwards until the crown edge 13 engages the groove 19.

A vertical post 21 is fixedly mounted upon the flat support 10 to one side of the rod 18 and has a bracket 22 slidably mounted thereon. A winged screw 23 threadedly engages through a portion of the bracket 22 and is adapted to be tightened against the vertical post 21 for holding the bracket 22 in various adjusted positions thereon. The bracket 22 carries a gauge 24 having a projecting movable arm 25 connected with a needle 26 which acts across the face of a calibrated scale of the gauge 24 for indicating movement of the arm 25. The arm is turnably supported and has its free end resting upon the top end of the post 18.

Since the rod 18 does not move when the support 10 is moved and the gauge 24 is mounted upon the support through the medium of the bracket 22 and the vertical post 21, downward movements of the flat support 10 relative to the rod 18 will cause the arm 25 to be pivoted to move the finger 26 across the face of the dial of the gauge 24. Thus as the flat support member 10 moves downwards with the gear 11 resting thereon, this downward movement will be indicated upon the gauge 24 and this indicating will continue until the crown edge 13 engages the groove 19 when downward pressure will be released permitting the reading of the gauge to be taken to determine the dimension between the back 12 of the gear 11 and its crown edge 13.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A bevel gear gauge for back to crown dimensions comprising a flat support upon which a bevel gear may be rested on its back, a rod disposed at right angles to said flat support and having a groove into which the crown edge of said bevel gear may engage and which is normally coplanar with the top face of the flat support, means for relatively movably connecting said flat support and rod for guiding the crown edge of said bevel gear along said rod until it engages said groove, and a gauge for measuring relative movements of said flat support and rod.

2. A bevel gear gauge for back to crown dimensions comprising a flat support upon which a bevel gear may be rested on its back, a rod disposed at right angles to said flat support and having a groove into which the crown edge of said bevel gear may engage and which is normally coplanar with the top face of the flat support, means for relatively movably connecting said flat support and rod for guiding the crown edge of said bevel gear along said rod until it engages said groove, and a gauge for measuring relative movements of said flat support and rod, said means comprising a base, several vertical studs extending therefrom and having said flat support slidably mounted thereon, lock nuts threadedly engaged upon the top end of said vertical studs, and resilient means for urging said flat support into a raised position against said lock nuts.

3. A bevel gear gauge for back to crown dimensions comprising a flat support upon which a bevel gear may be rested on its back, a rod disposed at right angles to said flat support and having a groove into which the crown edge of said bevel gear may engage and which is normally coplanar with the top face of the flat support, means for relatively movably connecting said flat support and rod for guiding the crown edge of said bevel gear along said rod until it engages said groove, and a gauge for measuring relative movements of said flat support and rod, said gauge being supported upon said flat support and having a pivotally mounted actuating arm engaging the top end of said rod.

4. A bevel gear gauge for back to crown dimensions comprising a flat support upon which a bevel gear may be rested on its back, a rod disposed at right angles to said flat support and having a groove into which the crown edge of said bevel gear may engage and which is normally coplanar with the top face of the flat support, means for relatively movably connecting said flat support and rod for guiding the crown edge of said bevel gear along said rod until it engages said groove, and a gauge for measuring relative movements of said flat support and rod, said means comprising a base, several vertical studs extending therefrom and having said flat support slidably mounted thereon, lock nuts threadedly engaged upon the top end of said vertical studs, and resilient means for urging said flat support into a raised position against said lock nuts, said rod being rested upon said base and slidably projecting through a complementary opening formed in said flat support.

5. A bevel gear gauge for back to crown dimensions comprising a flat support upon which a bevel gear may be rested on its back, a rod disposed at right angles to said flat support and having a groove into which the crown edge of said bevel gear may engage and which is normally coplanar with the top face of the flat support, means for relatively movably connecting said flat support and rod for guiding the crown edge of said bevel gear along said rod until it engages said groove, and a gauge for measuring relative movements of said flat support and rod, and means for resiliently urging said flat support in one direction relative to said rod.

6. A bevel gear gauge for back to crown dimensions comprising a flat support upon which a bevel gear may be rested on its back, a rod disposed at right angles to said flat support and having a groove into which the crown edge of said bevel gear may engage and which is normally coplanar with the top face of the flat support, means for relatively movably connecting said flat support and rod for guiding the crown edge of said bevel gear along said rod until it engages said groove, and a gauge for measuring relative movements of said flat support and rod, means for resiliently urging said flat support in one direction relative to said rod, and means for limiting said resilient means.

ROBERT ZIMMERMANN.